March 19, 1929.  J. C. ROSENBERG  1,705,626
STEAM ENGINE REVERSING GEAR
Filed March 25, 1927   3 Sheets-Sheet 1
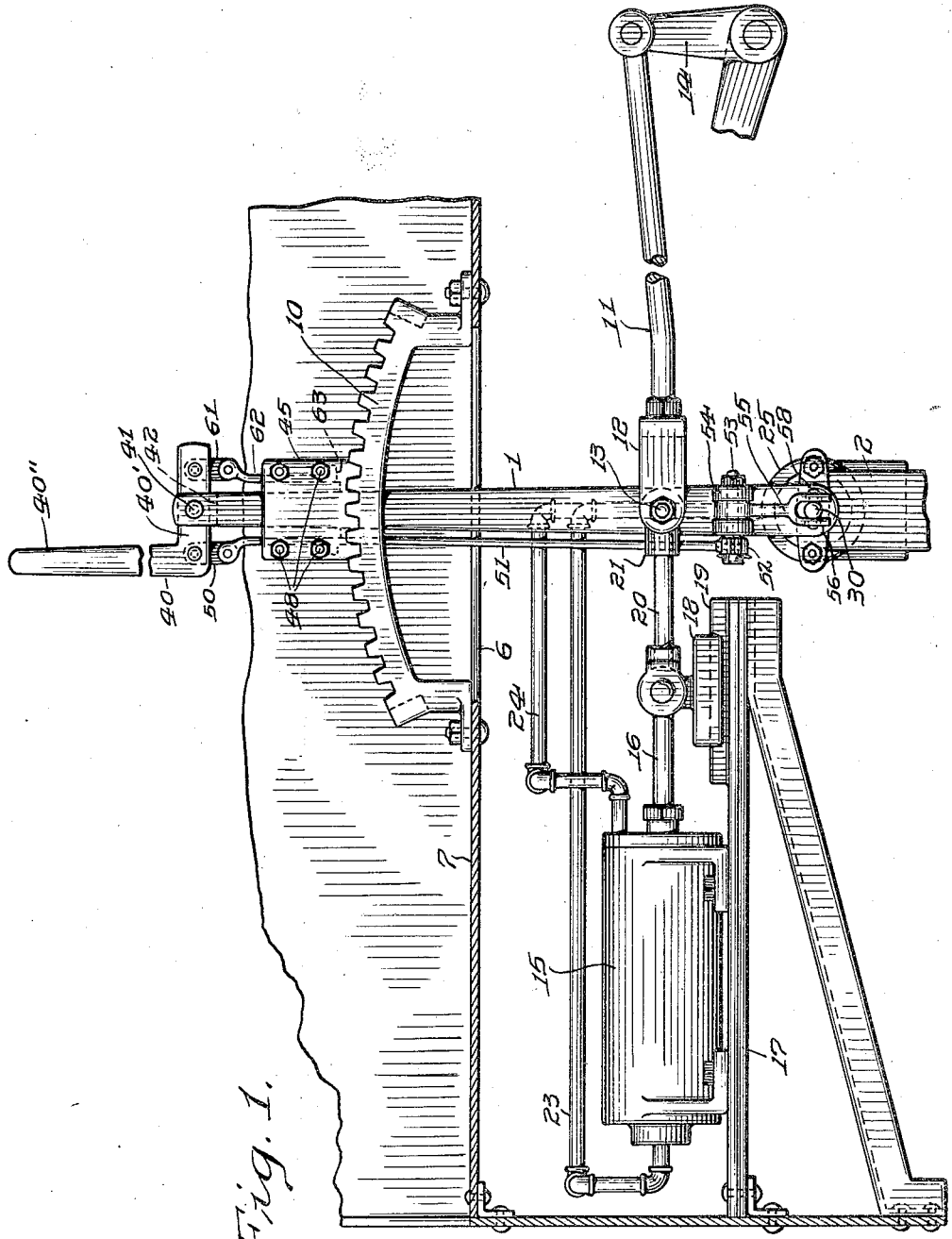
INVENTOR
Jacob C. Rosenberg.

March 19, 1929.  J. C. ROSENBERG  1,705,626
STEAM ENGINE REVERSING GEAR
Filed March 25, 1927   3 Sheets-Sheet 2
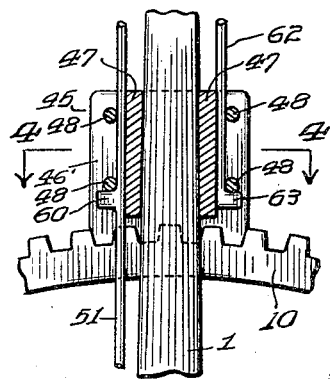
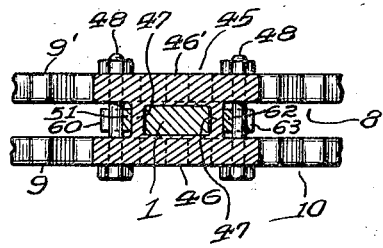
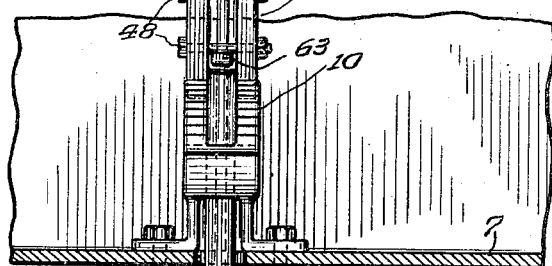
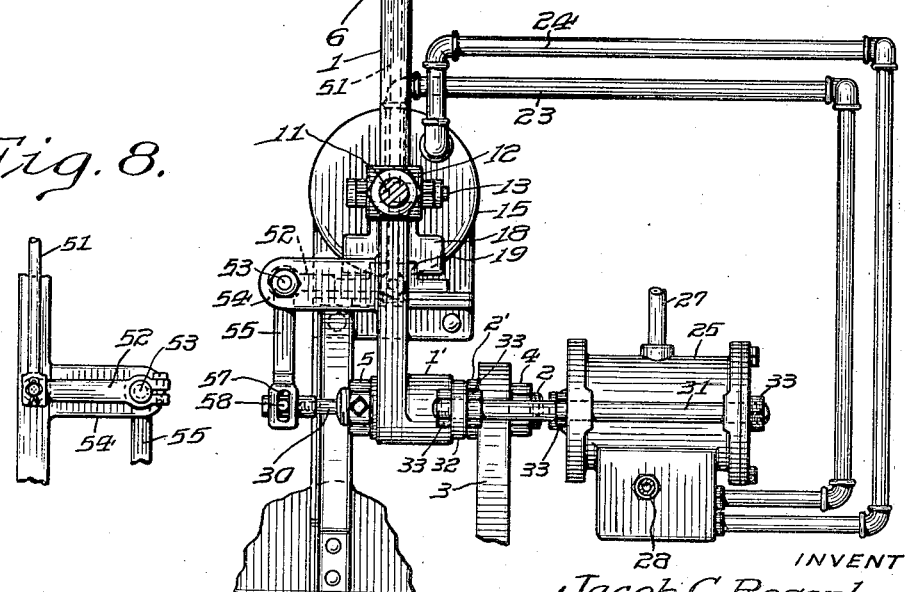
WITNESS
F. J. Hartman.
INVENTOR
Jacob C. Rosenberg.
BY
ATTORNEYS

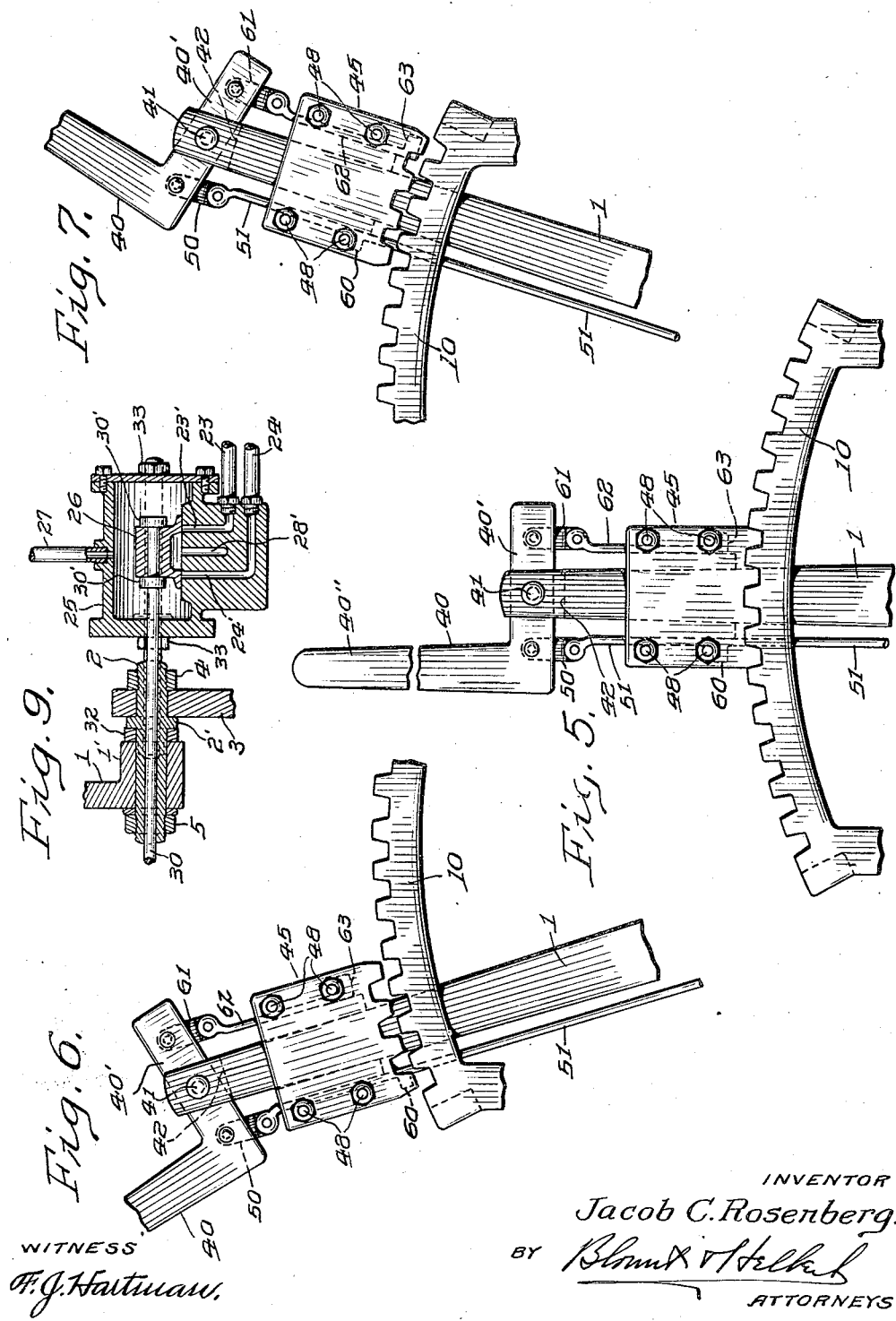

Patented Mar. 19, 1929.

1,705,626

UNITED STATES PATENT OFFICE.

JACOB C. ROSENBERG, OF YOUNGSTOWN, OHIO.

STEAM-ENGINE REVERSING GEAR.

Application filed March 25, 1927. Serial No. 178,183.

The present invention relates more particularly to mechanism for operating reverse levers of locomotives by mechanical means actuated from a suitable source of power such as compressed air, steam or the like, although the invention is equally applicable for similarly effecting movement of any other lever from one position to another.

A principal object of my invention, therefore, is to provide mechanism for effecting the aforesaid function satisfactorily and which when operatively installed in conjunction with the lever which is to be actuated does not interfere with or prevent the manual actuation of the lever when desired, thus enabling the operator, in case of failure of the air supply or other source of power normally employed, to operate the lever by hand without the necessity of making any changes or adjustments in the mechanism.

A further object of my invention is to provide means of the character aforesaid which may be readily installed in connection with the reverse levers of locomotives at present in use so as to enable such levers to be operated mechanically instead of manually when desired and thus relieve the engineer from the physical effort required for manual reversing.

Still further objects of the invention are to provide means operative to positively lock the reverse lever in any desired position on the quadrant with which it is associated; to provide means operative to insure the positive unlocking of the lever before the application of the power thereto and to provide a power reverse mechanism the parts of which are of relatively simple design and construction and not liable to get out of order or be damaged under the conditions of operation to which devices of this general character are ordinarily subjected.

The invention further includes other objects, advantages and novel features of design and construction as will hereinafter more fully appear.

To enable those skilled in the art to comprehend and practise the invention I have illustrated in the accompanying drawings and will now proceed to describe one form thereof as applied to the reverse lever of a locomotive, only such parts of the latter, however, being shown in the drawings as are requisite for an adequate understanding of the invention.

In the said drawings Fig. 1 is a side elevation of the reverse lever and associated parts as well as fregmentary portions of the locomotive itself, the lever being shown in central position, and Fig. 2 is a slightly enlarged front end view thereof. Fig. 3 is a fragmentary enlarged view in vertical section of the lever latch and adjacent mechanism and Fig. 4 a fragmentary section on line 4—4 in Fig. 3. Fig. 5 is a fragmentary enlarged side elevation of the upper end of the reverse lever, latch and associated parts with the lever in the same position as in Fig. 1; Fig. 6 is a view substantially similar to Fig. 5 but showing the lever at the rear end of its travel with respect to the quadrant and with the latch raised, and Fig. 7 is a view similar to Fig. 6 but showing the lever adjacent the opposite or forward end of the quadrant. Fig. 8 is a fragmentary detail view of a portion of the valve operating mechanism and Fig. 9 is a fragmentary view in central vertical section through the valve chest and associated parts. The same numerals are used to designate like parts in the several figures.

As shown, the reverse lever 1 having at its lower end a boss 1' is pivotally supported upon a pivot pin 2 for movement in a vertical plane. To this end the boss is bored for the passage of the pin which is provided with a flange 2' adapted to abut one face of a suitable supporting member 3 through which the pin extends and which is secured to some suitable part of the locomotive. Nuts 4 and 5 disposed on the threaded ends of the pin serve respectively to secure it to the supporting member and to maintain the boss 1' in place. The lever is extended upwardly through a slot 6 in the floor 7 of the cab in the usual way, the projecting end of the lever passing through the space 8 between the two laterally spaced halves 9, 9' of a notched quadrant, generally designated as 10, which is disposed above the floor 7 and bolted or otherwise rigidly secured thereto. At some suitable point between the lower end of the lever and the quadrant, the reverse or reach rod 11 is secured at its rear end to the former by means of a clevis 12 and pivot bolt 13, while the forward end of the rod is pivotally connected with one arm of a bell crank 14 the other arm of which is in turn connected with the slide block (not shown) of the valve controlling mechanism of the locomotive in the usual way. The several parts to which reference has hitherto been made require no further or extended description as in one form or another they are commonly present in locomotives although their precise construction and arrangement may vary considerably; it is therefore to be understood that the said parts are shown in the drawings in a conventional or typical manner merely and that their construction and arrangement are capable of wide variation and modification so long as the movement of the lever back and forth within the limits of the quadrant is operative to effect corresponding movement of the rod 11.

For moving the reverse or main lever about its pivot by mechanical power instead of by hand, a power cylinder 15 containing a reciprocatory piston disposed at the inner end of a piston rod 16 is provided and secured on a suitably supported bracket 17 carried by the frame or other convenient part of the locomotive. The outer end of the piston rod 16 is connected through the medium of a cross head 18, slidably mounted on a guide 19 carried by the bracket 17, with a connecting rod 20 in turn secured, through the medium of a clevis 21 or other suitable device, to the reverse lever 1 preferably in the vicinity of the pivot bolt 13 in such manner that when the piston (not shown) is disposed at the center of its travel in the cylinder the reverse lever 1 will be in upright or neutral position and as the piston is moved in either direction from such central position the reverse lever will be correspondingly moved about its pivot. This movement of the piston in the power cylinder may be effected by any suitable fluid such as compressed air, steam or the like introduced to the cylinder through pipes 23, 24 respectively extending from the ends of the cylinder to a valve chest 25 which, with its contained valve, is hereinafter more particularly described.

Within the valve chest is disposed a valve 26 adapted to control the flow of the power fluid to the power cylinder after it has been admitted to the chest through an inlet pipe 27 connected with a suitable source of fluid supply. The valve may be of any suitable form for accomplishing its intended function, for example and as conventionally shown in Fig. 9, a slide D valve operative to control the admission of the fluid to the ports 23', 24' with which the valve chest is provided and which respectively communicate with the inlet pipes 23 and 24 as well as the exhaust port 28' disposed between the other ports and communicating with an exhaust pipe 28. The position of the valve with respect to the several ports is controlled through the medium of a valve stem 30 connected with the valve and since, as will hereinafter more fully appear, a slight oscillatory motion is communicated to the stem when the lever 1 is moved, the connection between the valve and the stem is preferably arranged so that the stem is free to turn axially with respect to the valve. This may be conveniently accomplished by extending the stem through a hole drilled through the valve and providing the stem on either side of the latter with collars 30' which bear against the adjacent faces of the valve so that when the stem is moved longitudinally corresponding movement will be imparted to the valve although the stem is free to turn axially with respect to it.

The valve chest may be rigidly supported in any suitable way, conveniently by means of a pair of rods 31 disposed on opposite sides of the chest and extended through flanges at the ends thereof and also through a strap 32 having outwardly projecting ears for the reception of the rods disposed on or formed integrally with the pivot pin, nuts 33 disposed at suitable points on the rods serving to secure the parts in position. If desired, however, the valve chest may be supported in any other suitable way, the precise arrangement being frequently dictated by the particular construction of the locomotive or other mechanism to which the power reverse mechanism is applied.

To facilitate connection of the valve stem to its operating mechanism the pivot pin 2 is axially bored for the passage of the rod which is extended entirely through the pin and terminated at a suitable distance on the opposite side of the reverse lever from that on which the valve chest is disposed.

Means now to be described are provided for reciprocating the valve stem 30 so as to control the admission of the power fluid to the power cylinder through the valve to move the reverse lever when and as desired and also for locking the reverse lever to the quadrant in any desired position, said means comprising, among other things, an operating lever, a latch and means interconnected therewith and with the valve stem 30 operative upon movement of the operating lever to actuate the valve. More specifically, at the upper end of the reverse lever 1 I dispose the operating lever 40 which conveniently comprises a substantially horizontally extending portion or cross member 40' and a vertically extending handle 40" rising from one end thereof. The cross member 40' is pivoted centrally to the upper end of the reverse lever by a pivot bolt 41 extending transversely through the parts and I prefer in effecting this connection to form a slot 42 in the upper end of the lever and dispose the cross member therein. Under these conditions the ends of the bottom of the slot form stops adapted to limit the movement of the operating lever in either direction about its pivot as clearly shown in Figs. 6 and 7 so that when the operator manually pushes or pulls on the handle 40" when the operating lever is in central or neutral position as shown in Fig. 6 the lever will be rotated initially for a limited distance about its pivot and relatively to the reverse lever until the cross member engages one end or the other of the bottom of the slot after which further pressure on the operating handle is effective to move both the operating lever and the reverse lever 1 as a unit either forward or back in accordance with the direction of the force applied to the handle. The purpose of this construction will hereafter more fully appear.

Slidably mounted on the reverse lever between the operating handle and the quadrant is a latch, generally designated as 45, and which in its preferred embodiment comprises laterally spaced side plates 46, 46' provided with teeth on their lower edges adapted to mesh with the teeth on the upper edges of the spaced halves 9, 9' of the quadrant 10, these side plates being desirably connected by integral webs 47 extending between their adjacent faces and spaced longitudinally to permit the lever to extend between them as best shown in Figs. 3 and 4. The outer ends of the side plates of the latch may also be connected if desired by transversely extending suitably disposed bolts or spacers 48 and in certain constructions it may be found desirable to dispense with the webs 47 entirely and simply connect the side plates together by means of the bolts which, in such case, may be provided with spacer sleeves between the plates. It will thus be apparent that the latch is free to slide vertically on the lever and that when in lowered position the teeth with which it is supplied are effective to mesh with the teeth on the quadrant and lock the reverse lever in predetermined position with respect thereto.

The cross member of the operating lever is connected on one side of the pivot bolt 41 with the valve stem 30 through the medium of a link 50 pivoted at one end to the lever and at its other to a valve rod 51 which extends downwardly through the latch and quadrant in substantial parallelism with the reverse lever and, at its lower end, is pivotally connected to one end of a crank arm 52 whose other end is supported on a short horizontally extending shaft 53 journaled in a slotted bracket 54 mounted on the reverse lever near its lower end. The shaft 53 also serves to support the upper end of a depending crank arm 55 whose lower end is provided with a fork 56 adapted to receive the end of the valve stem 30; the sides of the fork may be slotted as at 57 to receive a pin 58 extending through the stem. Thus in effect the arms 52 and 55 and shaft 53 together form a bell crank so disposed that longitudinal movement of the valve rod 51 is operative to turn the bell crank about the axis of shaft 53 and in turn move the valve stem in or out. While the fork and pin connection between the arm 55 and the valve stem is a convenient one, any other form of connection may be employed with equal facility at this point so long as it is effective to permit reciprocation of the stem in accordance with the movements of the arm 55.

It will of course be understood that the various parts to which reference has just been made are preferably so arranged that when the cross member of the operating handle is disposed at right angles to the reverse lever as in Fig. 6 the valve in valve chest 25 is so positioned that the operating fluid is cut off from the power cylinder but that when the valve rod 51 is raised or lowered by suitable movement of the operating lever the valve will be moved so as to admit the power fluid to the power cylinder to move the piston therein in the same direction as the operating lever is moved with respect to the reverse lever or, in other words, when the operating lever is pulled back toward the position shown in Fig. 6 the operating fluid will be admitted to the right hand end of the power cylinder when viewed as in Fig. 1 so as to move the reverse lever to the rear and when the operating lever is pushed forward toward the position shown in Fig. 7 the power fluid will be admitted to the left hand end of the power cylinder so as to move the reverse lever forward.

Since when the latch is lowered to engaging position with the quadrant the reverse lever is operatively locked to the latter, it is desirable that means be provided for raising the latch to fully disengaged position prior to the admission of the power fluid to the power cylinder so that the latch will be entirely clear of the quadrant before any movement of the piston in the power cylinder takes place. To this end I therefore provide the valve rod 51 with a lug 60 in alignment with one of the bolts or spacers 48 and so positioned that when the cross member of the operating lever is normal to the reverse lever and the latch thus in lowered position, the lug will lie beneath and in engagement or substantial engagement with the bolt or spacer as best shown in Fig. 3. Thus as the operating lever is moved forward relatively to the reverse lever, the lug will tend to lift the latch through its engagement with the spacer and will continue such lifting movement until the limit of movement of the operating lever in that direction is attained, at which time the latch will be entirely clear of the quadrant.

However, as the lug 60 is only effective to raise the latch during movement of the operating lever in one direction, for example, in the particular construction illustrated, during the forward movement of the operating lever, I also provide substantially similar means for lifting the latch during movement of the operating lever in the opposite direction, said means conveniently comprising a link 61 pivoted to the cross member of the operating lever on the opposite side of the pivot bolt 41 and carrying at its lower end a lifting rod 62 provided with a lug 63 operative to engage one of the spacers or bolts 48 disposed on the other side of the reverse lever from the spacer which is engageable by the lug 60. Thus, upon any rearward movement of the operating handle the lug 63 by engagement with the adjacent spacer is operative to raise the latch and clear the teeth thereof from the quadrant before or substantially at the same time as the operating lever reaches the limit of its movement relative to the reverse lever. It will of course be obvious that when the operating lever is thus moved the lug 60 moves downwardly and away from its spacer or bolt 48 in correspondence with the downward movement of the rod 51 while, similarly, when the operating handle is thrown forward the lug 63 simply moves away from its bolt and again approaches the latter when the handle is returned toward neutral position.

Ordinarily, as the latch is of considerable weight it will readily return by gravity to engaging position when unsupported by either of the lugs 60 or 63, but under certain conditions it may be found desirable to supplement the force of gravity by a spring or other like device so as to insure the positive return of the latch.

While it is believed the operation of the device when constructed and installed substantially as hereinbefore described will be readily apparent, brief reference may now be made thereto as follows: Assuming the reverse lever to be in central position with the latch in engagement with the quadrant, the operator, when wishing to shift the lever toward the rear, grasps the handle of the operating lever and pulls it backward, thus turning the operating lever about its pivot relatively to the reverse lever. This movement of the operating lever is initially operative to raise the latch through coaction of the lug 63 and adjacent spacer 48 and also to move the valve stem 30 forward through depression of valve rod 51, and as the valve in the valve chest 25 is preferably so constructed and set with respect to its lap and lead that the power fluid is not admitted to the power cylinder until the operating handle has reached or substantially reached the limit of its movement relative to the reverse lever and the latch is entirely out of engagement with the quadrant, no power is applied to the reverse lever until the latter is entirely free to move. When this condition is attained, however, the power fluid is admitted to the power cylinder to actuate the piston and move the reverse lever rearwardly until its desired position is reached when the operator, by releasing his hold on the operating handle, or giving it a slight forward movement, causes the latch to drop, thus simultaneously moving the valve in the valve chest 25 to cut-off position with exhaust open and locking the reverse lever to the body. In a similar way when it is desired to shift the reverse lever forward either from central position or from some point in the rear thereof, the operator merely pushes on the operating handle so as to throw the operating lever forward relatively to the reverse lever, thus raising the latch through coaction of lug 60 and its adjacent bolt and admitting the power fluid to the power cylinder in a direction to urge the reverse lever forward to the desired position upon the attainment of which the operating handle is brought back to normal position thereby cutting off the power fluid from and opening the exhaust to the power cylinder and re-engaging the latch to lock the lever to the quadrant. Since, as hitherto stated, the valve 26 may be of any well known construction and since, in order to accomplish the results just described, the design of the valve with respect to its lap and lead as well as its setting will naturally vary somewhat in accordance with the particular type of valve employed and the particular port arrangement adopted as will be readily comprehended by those familiar with the art, it is to be understood that in the accompanying drawings the valve and port arrangement have been merely shown in a conventional manner and are not intended to illustrate specifically any particular arrangement or setting of the valve.

It will be apparent to those skilled in the art that apparatus constructed in accordance with the present invention particularly lends itself to installation on existing locomotives without material modification of the latter since it is generally feasible to employ the usual reverse lever of the locomotive by slotting the upper end for the reception of the operating handle, attaching the bracket 54 or equivalent device, drilling through the pivot pin 2 for the passage of the valve rod, and slotting the ends of the ordinary latch to allow the valve rod and lifting rod to pass through it. This enables the installation of power reverse mechanism at a relatively low cost and without the necessity of keeping the locomotive in the shop for a relatively long time while the work is being done.

It will be further apparent that the installation of the present invention in no way interferes with the ability of the engineer to shift the reverse lever manually in the ordinary way if the power fluid be shut off from the valve chest 25 either intentionally or through accidental failure of the power fluid supply, for, under such conditions, it is only necessary to continue to push or pull the operating handle manually in the desired direction with sufficient force to shift the reverse lever after the initial relative movement of the operating lever with respect thereto has been completed so that the operating and reverse levers will thereafter move as a unit. This constitutes a distinct advantage of my invention in that it makes the operation of the power fluid locomotive independent of the power fluid supply and also enables the engineer to employ either a power or manual reverse as he may wish if means such as a valve in inlet pipe 27 are supplied for cutting off the power fluid from the valve chest when desired.

Although I have herein more particularly referred to the use of the invention in connection with the reverse lever of a locomotive, it is to be understood that it may with equal facility be utilized for the power actuation of other levers and like instrumentalities, and further while I have described and illustrated one form of my invention with considerable particularity, I do not thereby desire or intend to limit myself to any precise details of construction or arrangement of the various parts as the same, if desired, may be materially varied and modified from the precise embodiments to which I have referred in order to facilitate the installation of the invention on various types of locomotives, to enable the invention to be satisfactorily employed under various conditions of operation or for other reasons, without departing from the spirit and scope of the invention as defined in the appended claims.

Having thus described my invention, I claim and desire to protect by Letters Patent of the United States:

1. In mechanism, the combination of a main lever journaled to move about a pivotal axis, a power cylinder having a fluid actuated piston, means disposed between and connecting the piston and the lever, a valve chest containing a valve operative to control the admission of fluid to the power cylinder, a valve stem extending from the valve along the pivotal axis of the lever, an operating lever pivotally mounted on the main lever for limited oscillatory movement with respect thereto, a quadrant adjacent the main lever, a latch embracing and slidably disposed on the main lever between the operating lever and the quadrant and when in lowered position cooperative with the latter to lock the main lever thereto, a pair of rods extending from the operating lever to the latch on opposite sides of the main lever and each carrying means respectively adapted to raise the latch when the operating lever is moved in a predetermined direction about its pivot, and means connecting one of said rods with said valve stem and operative to move the latter when the operating lever is moved in either direction about its pivot.

2. In mechanism, the combination with a main lever journaled for movement about a horizontal axis, of a valve chest diposed on one side thereof, a valve in the chest having a valve stem extending through the lever along the pivotal axis thereof, a power cylinder having a fluid actuated piston connected with the lever and operable to move the latter about its axis, connections between the cylinder and the valve chest for admitting fluid to the former in correspondence with the movement of the valve in the latter, latching mechanism carried by the lever, an operating lever also carried by the main lever and capable of limited movement with respect thereto in two directions, and means interconnected with said operating lever and said valve stem adapted to move the latch out of latching position upon movement of the operating lever in one of said directions and to move said valve to admit fluid to the cylinder upon movement of the operating lever in either of said directions.

3. In mechanism, the combination with a main lever journaled adjacent one end to move about a pivotal axis, of a power cylinder having a fluid actuated piston, connections between the piston and the lever whereby movement of the piston is operative to move the lever about said axis, a valve chest having a valve adapted to control the flow of fluid to the power cylinder, a valve stem extending from the valve along the pivotal axis of the lever, an operating lever pivoted for limited movement adjacent the other end of the main lever, and means movable with the main lever when it is oscillated on its pivot and connecting said operating lever and said valve stem and adapted to reciprocate said stem when said operating lever is oscillated about its pivot.

4. In mechanism, the combination with a main lever journaled adjacent one end to move about a pivotal axis, of a power cylinder having a fluid actuated piston, connections between the piston and the lever whereby movement of the piston is operative to move the lever about said axis, a valve chest having a valve adapted to control the flow of fluid to the power cylinder, a valve stem extending from the valve along the pivotal axis of the lever in a plane normal to that of its path of movement, an operating lever pivoted for limited movement adjacent the other end of the main lever, and means movable with the main lever connecting said operating lever and said valve stem and adapted to reciprocate said stem when said operating lever is oscillated about its pivot, said means comprising a rod pivotally connected to and extending from the operating lever substantially parallel to the main lever and a bell crank connection interposed between the opposite end of the rod and the valve stem.

5. In mechanism, the combination of a main lever having a laterally extending boss adjacent one end journaled for rotation on a supporting member, a power cylinder having a fluid actuated piston, connections between said piston and said lever operative to move the lever in correspondence with the movements of the piston, a valve chest, a valve in the chest operative to control the flow of fluid to the power cylinder, a valve stem extending from the valve through the boss at right angles to the plane of oscillation of the lever and terminating on the opposite side of the lever, an operating lever mounted for limited oscillatory movement adjacent the other end of the main lever, a latch carried by and embracing the lever, a quadrant cooperative with the latch, means operable by the operating lever for disengaging the latch from the quadrant, and means including a bell crank supported from the lever and connected with the operating lever and the valve stem operative to move the latter in correspondence with movement of the operating lever.

6. The combination with a main lever and a quadrant disposed adjacent thereto, of a latch slidably mounted on the lever and engageable with said quadrant when in one position to lock the lever to the quadrant, an operating lever pivoted to the main lever, a pair of rods extending from the operating lever to the latch upon opposite sides of the main lever, each rod being provided with a lug, and means carried by the latch on opposite sides of the main lever respectively adapted for engagement by said lugs to slide the latch along the main lever when said operating lever is moved about its pivot.

7. The combination with a main lever and a quadrant disposed adjacent thereto, of a latch slidably mounted on the lever and engageable with said quadrant when in one position to lock the lever to the quadrant, an operating lever having a cross member pivotally secured to the main lever and an operating handle, a pair of rods connected to said cross member on opposite sides of the pivot and extending to the latch substantially parallel to the main lever, each rod being provided with a lug, and means carried by the latch adjacent each rod adapted to be engaged by the adjacent lug when said operating lever is moved about its pivot in a predetermined direction.

8. The combination with a main lever provided with a slot in one end and journaled adjacent its other end for rotation about a pivotal axis, of a quadrant disposed adjacent the lever, a latch slidably mounted on the lever and engageable with the quadrant when in one position to lock the lever thereto, an operating lever having a cross member seated in said slot and pivotally connected to the main lever, a pair of rods connected to said cross member on opposite sides of its pivot and extending to the latch, each rod being provided with a lug, and means carried by the latch adjacent each rod adapted to be engaged by the adjacent lug when the operating lever is moved about its pivot in a predetermined direction.

In witness whereof, I have hereunto set my hand this 22nd day of March, 1927.

JACOB C. ROSENBERG.